United States Patent [19]
Arick et al.

[11] 3,995,785
[45] Dec. 7, 1976

[54] APPARATUS AND METHOD FOR FORMING DYNAMOELECTRIC MACHINE FIELD WINDINGS BY PUSHING

[75] Inventors: Robert E. Arick, Fort Wayne, Ind.; Ralph A. Vogel, Three Rivers, Mich.

[73] Assignee: Essex International, Inc., Fort Wayne, Ind.

[22] Filed: Dec. 12, 1974

[21] Appl. No.: 531,885

Related U.S. Application Data

[63] Continuation of Ser. No. 331,992, Feb. 12, 1973, abandoned.

[52] U.S. Cl. .............................. 242/1.1 R; 29/596; 140/92.1; 226/171; 242/7.03
[51] Int. Cl.² .................... B21F 3/00; B65H 81/00
[58] Field of Search .......... 242/101 R, 101 A, 7.03, 242/7.05 R–7.05 C, 7.06, 7.13, 82, 83; 140/92.1; 29/205 R, 205 C, 596; 226/171

[56] References Cited
UNITED STATES PATENTS

| | | | |
|---|---|---|---|
| 627,722 | 6/1899 | Edwards | 242/83 |
| 1,977,828 | 10/1934 | Laib et al. | 242/1.1 R |
| 2,936,509 | 5/1960 | Martin | 242/83 X |
| 2,967,672 | 1/1961 | Zwayer | 242/1.1 R |
| 3,082,966 | 3/1963 | Frederick | 242/1.1 R |
| 3,227,383 | 1/1966 | Zywietz | 242/7.13 |
| 3,251,559 | 5/1966 | Moore | 242/1.1 R |
| 3,347,474 | 10/1967 | Frank | 242/1.1 R |

Primary Examiner—Stanley N. Gilreath
Assistant Examiner—John M. Jillions

[57] ABSTRACT

An apparatus and method for placing magnet wire in the slots respectively defined by spaced, parallel blades of coil transfer apparatus which lie on an imaginary cylinder thereby to form a dynamoelectric machine field winding. The wire is pushed and simultaneously guided with a motion having components in at least two mutually perpendicular directions in a path having sections respectively aligned with at least two of the slots thereby to push the wire into the slots, the path also having sections respectively within and outside of the cylinder.

25 Claims, 17 Drawing Figures

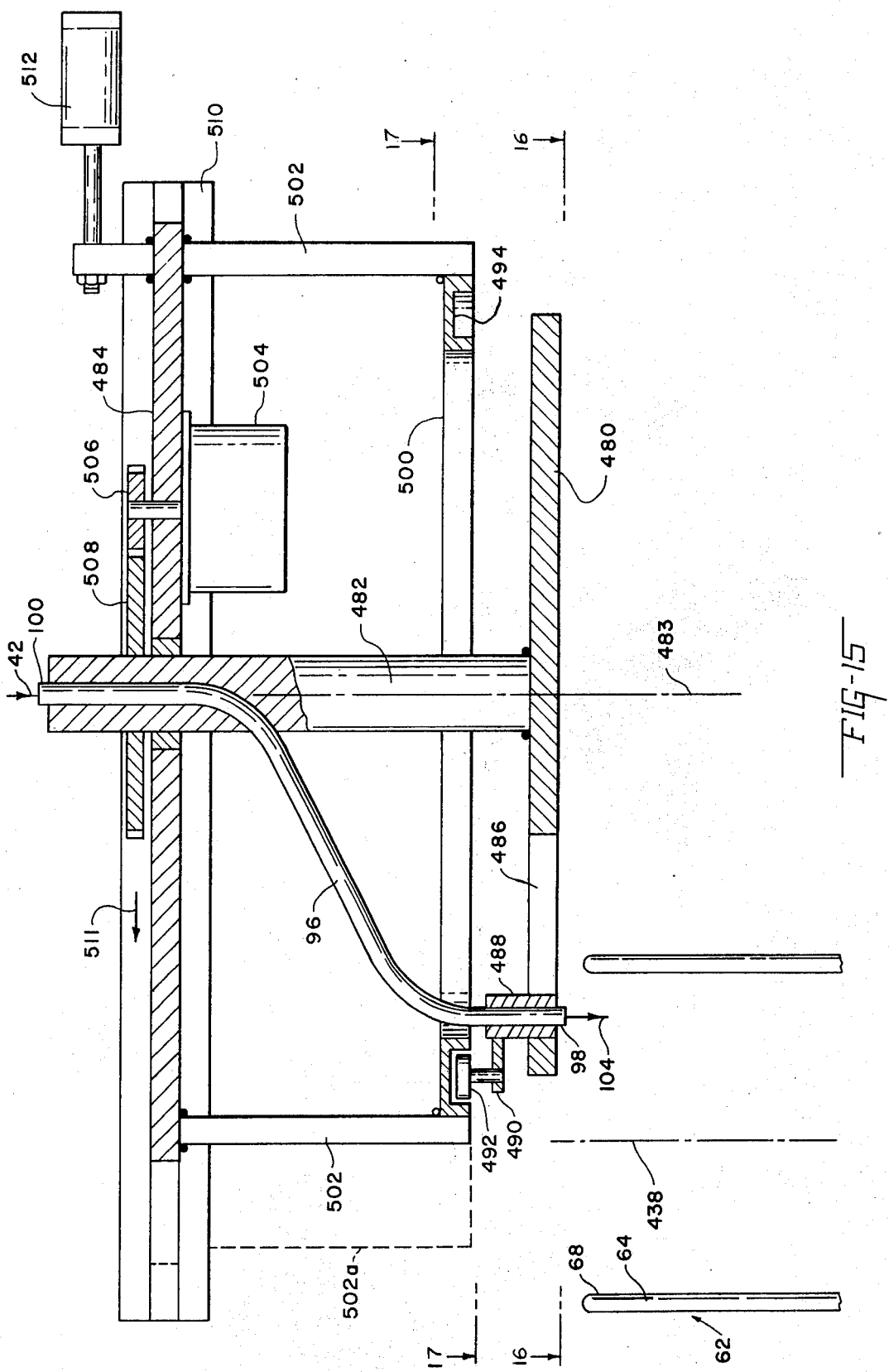

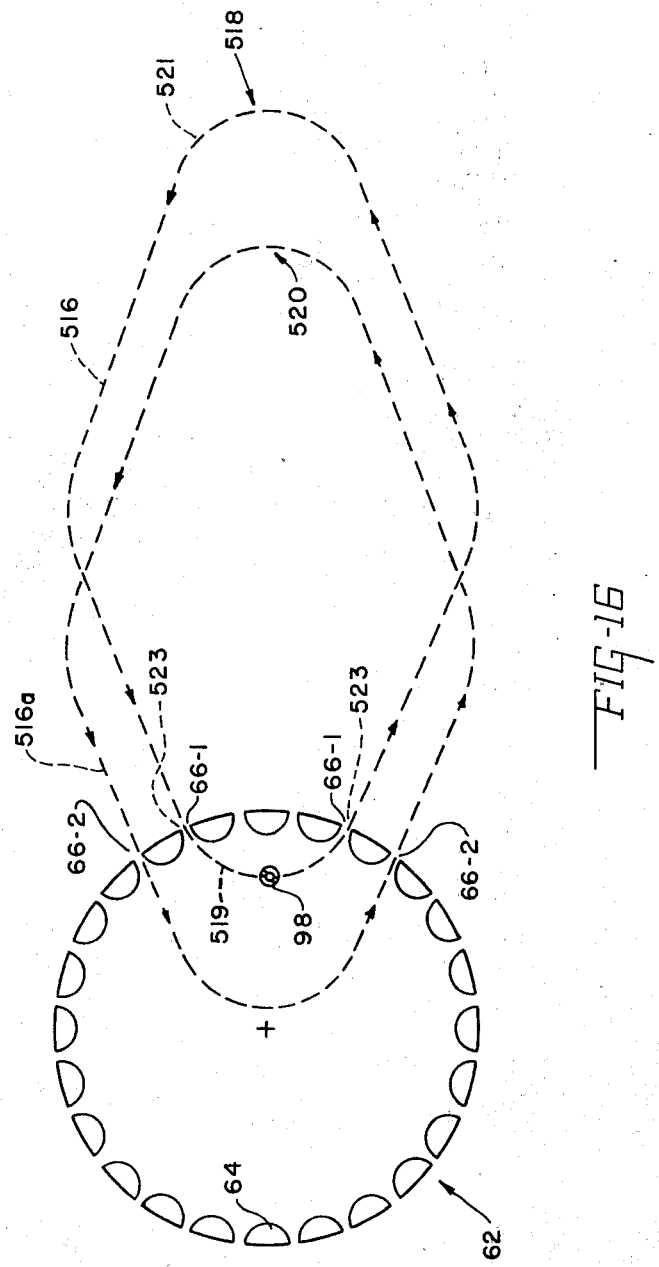

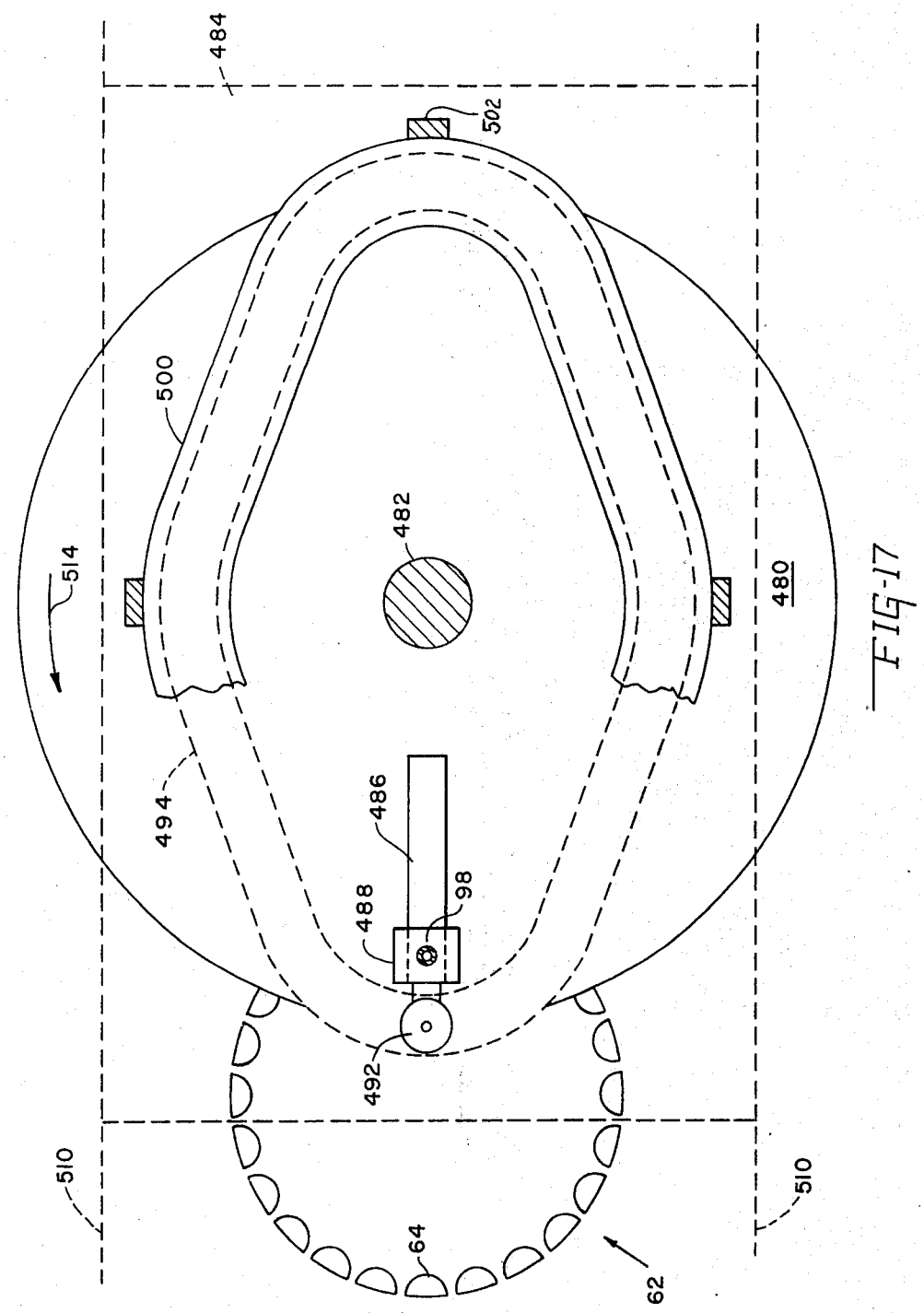

APPARATUS AND METHOD FOR FORMING DYNAMOELECTRIC MACHINE FIELD WINDINGS BY PUSHING

BACKGROUND OF THE INVENTION

1. Field of the Invention

This invention relates generally to an apparatus and method for forming dynamoelectric machine field windings, and more particularly to an apparatus and method for forming such windings by pushing. This application is a continuation of application Ser. No. 331,992, filed Feb. 12, 1973, now abandoned.

2. Description of the Prior Art

In the past, two different types of apparatus have been employed for placing dynamoelectric machine field windings in the slots of a stator core member. In the so-called in-place or gun winder, a free end of the wire is secured and a gun is oscillated through the bore of the core member thereby withdrawing the wire from a source and placing it directly in the desired slots; since the free end of the wire is fixed, the wire is in essence wound around selected teeth which define the slots thereby placing the wire under tension. A typical gun winder is shown for example in U.S. Pat. No. 3,025,008 assigned to the Assignee of the present application.

In the so-called coil-insertion or coil-injection apparatus, prewound coils are first placed on a circular array of elongated blades, the stator core is then positioned on the blades with the blades respectively engaging the inner ends of the stator core teeth, and the coils are then pushed bodily into the stator core member slots. Such coil insertion apparatus is shown for example in U.S. Pat. Nos. 2,432,267, 3,324,536, and 3,447,225, the latter patent being assigned to the Assignee of the present application. The coils for use with such coil insertion apparatus are typically formed by securing the free end of the wire to a coil form and then winding or wrapping the wire around the coil form as the wire is withdrawn from a source, the wire again being placed in tension as it is being wound. Typical apparatus for prewinding such coils is shown for example in U.S. Pat. No. 3,575,219, also assigned to the present applicant.

The above-described prior apparatus and methods for forming and placing dynamoelectric machine field coils wind or wrap the magnet wire under tension around an element. A part of the thickness of build of insulation on magnet wire used for winding dynamoelectric machine field windings is dictated by tension and/or sliding friction to which the wire is subjected, particularly in a gun winder, rather than by electrical requirements for insulation per se. Thus, an apparatus and method for forming dynamoelectric machine field coils which does not involve the application of tension to the wire will permit use of insulation having a lesser thickness of build which in turn will permit greater slot fill.

U.S. Pat. No. 3,791,419 assigned to the assignee of the present application discloses apparatus for forming dynamoelectric machine field windings by pushing. U.S. Pat. No. 3,347,474 discloses apparatus wherein the end turns of dynamoelectric machine field windings are formed by pushing.

SUMMARY OF THE INVENTION

In accordance with the invention, an apparatus and method is provided for placing magnet wire in the slots respectively defined by spaced, parallel blades of coil transfer apparatus which lie on an imaginary cylinder thereby to form a dynamoelectric machine field winding. The apparatus of the invention, in its broader aspects, includes means for guiding wire toward the blades and means for pushing the wire through the guide means. Means are provided for moving the guide means relative to the blades with a motion having components in at least two mutually perpendicular directions in a path having sections aligned with at least two of the slots thereby to push the wire into the slots, the path also having sections respectively within and outside of the cylinder.

The method of the invention, in its broader aspects, includes the steps of advancing the wire by pushing the same on its axis, and guiding the wire with a motion having components in at least two mutually perpendicular directions in a path having sections respectively aligned with at least two of the slots thereby to push the wire into the slots, the path also having sections respectively within and outside of the cylinder.

It is accordingly an object of the invention to provide an improved apparatus for placing magnet wire in the slots defined by the blades of coil transfer apparatus thereby to form dynamoelectric machine field windings.

Another object of the invention is to provide an improved method of placing magnet wire in the slots defined by the blades of coil transfer apparatus thereby to form dynamoelectric machine field windings.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 15 is a cross-sectional view showing a further embodiment of the apparatus of the invention for placing dynamoelectric field coils on the blades of coil insertion apparatus by pushing;

FIG. 16 is a cross-sectional view taken generally along the line 16—16 of FIG. 15; and FIG. 17 is a view, partly a cross section and partly broken away, taken generally along the line 17—17 of FIG. 15.

DESCRIPTION OF THE PREFERRED EMBODIMENTS

Figure 1:
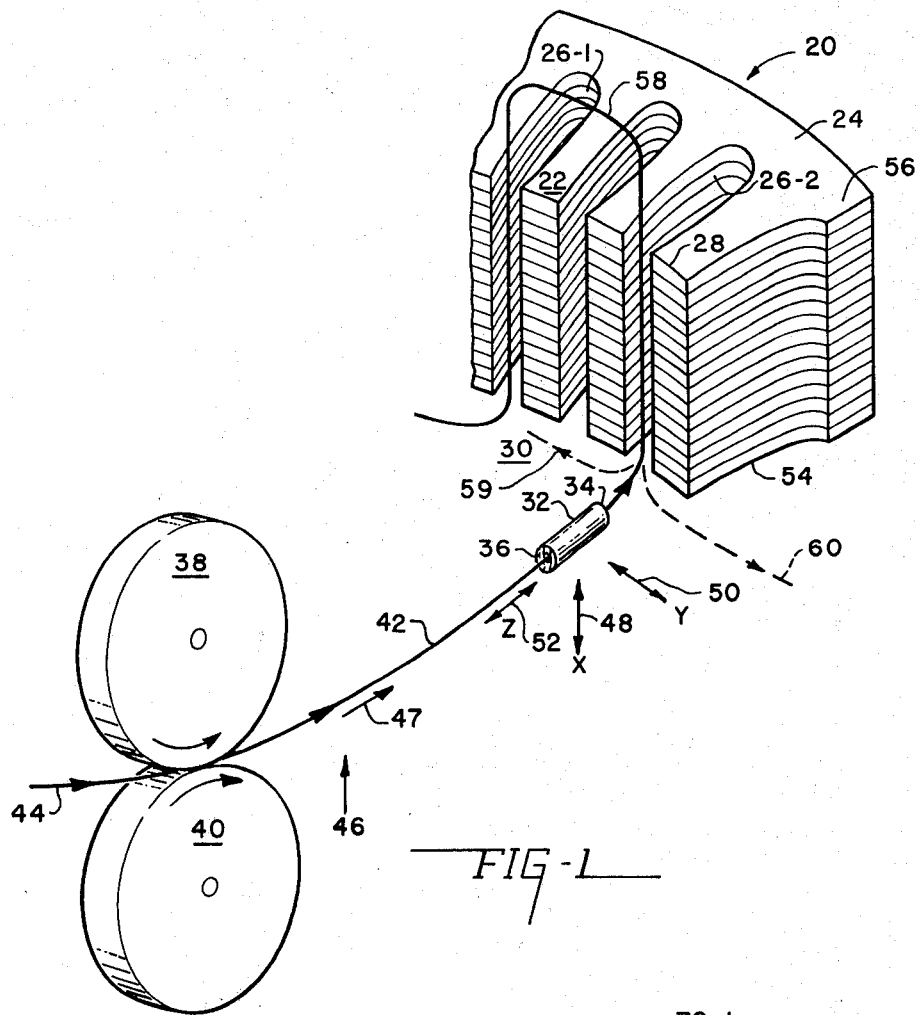
FIG. 1 is a fragmentary, schematic view illustrating the method of the invention as applied to a dynamoelectric machine stator core member.

Referring now to FIG. 1 of the drawings, there is shown at 20 a segment of a dynamoelectric machine stator core member having teeth 22 extending radially inwardly from yoke 24 and defining winding slots 26 therebetween, the inner ends 28 of teeth 22 defining a bore 30 having an axis (not shown) which extends in parallel relationship with slots 26.

In accordance with the invention, a wire guide member or gun 32 is provided having a wire dispensing end 34 facing teeth 22 in slots 26, and an opposite end 36. Gun 32 has an axis which in this embodiment extends radially with respect to the axis of bore 30.

Means, shown here as comprising a pair of rollers 38, 40 are provided for engaging magnet wire 42, withdrawing the wire from a source (not shown) as at 44, and advancing the wire by pushing to and through gun 32, as at 46.

Means (not shown) are provided for imparting motion to gun 32 relative to stator core member 20 at least in mutually perpendicular X and Y axes shown by arrows 48 and 50. Motion may also be imparted to gun 32 relative to stator core member 20 in the Z axis is as shown by arrows 52.

In accordance with the method of the invention, gun 32 is initially disposed with dispensing end 34 facing slot 26-1 and with its axis below bottom side 54 of stator core 20. With rollers 38, 40 pushing wire 42 through gun 32 toward stator core member 20 as shown by arrow 47, gun 32 is moved upwardly relative to stator core member 20 in X axis 48 thereby pushing wire into slot 26-1. Movement of gun 32 in X axis 48 continues until gun 32 is above upper surface 56 of stator core member 20. With rollers 38, 40 continuing to push wire 42 through gun 32 in direction 47, gun 32 is then moved relative to stator core member 20 in Y axis 50 toward slot 26-2, and is then moved downwardly facing slot 26-2 in X axis 48 thereby forming end turn 58 and pushing the wire into slot 26-2. Upon reaching a point below lower side 54 of stator core member 20, gun 30 may again be moved in Y axis 50 thereby starting formation of another end turn of a concentric winding on the opposite side of stator core member 20 as shown in dashed lines at 59. Alternatively, stator core member 20 may be moved relative to gun 30 in Y axis 50 to form another end turn of a wave winding, as shown in dashed lines at 60.

It will now be seen that repetition of the above-described sequence of movements of gun 32 with rollers 38, 40 continuously pushing wire 42 in direction 47 will result in formation of either a concentric winding or a wave winding in stator core slots 26.

Figure 2:
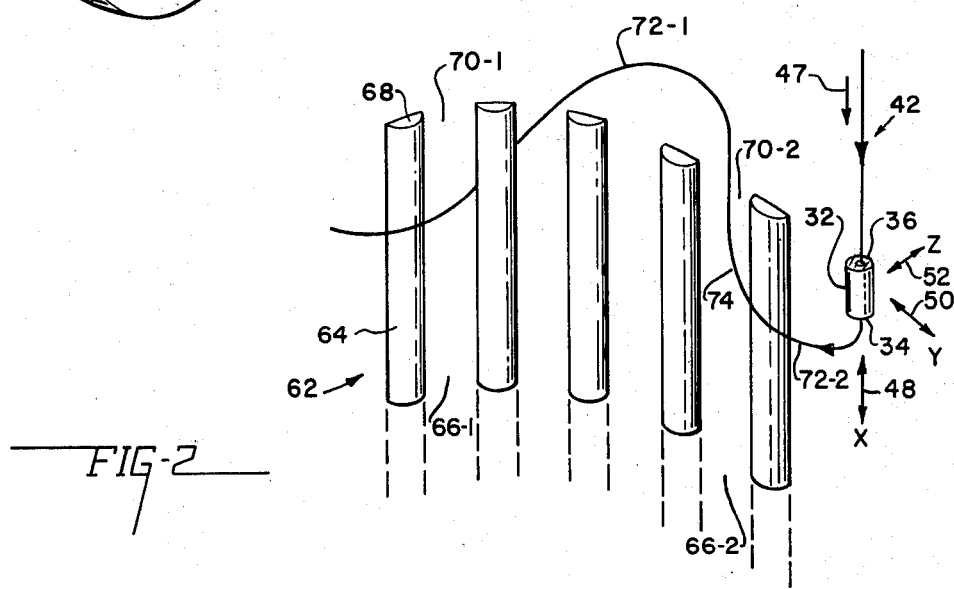
FIG. 2 is a fragmentary, schematic view illustrating the method of the invention as applied to coil transfer apparatus.

Referring now to FIG. 2 in which like elements are indicated by like reference numerals, there is shown at 62 a portion of a circular array of blades 64 of coil insertion apparatus. Blades 64 lie on an imaginary cylinder having an axis (not shown) and define slots 66 therebetween. Blades 64 have distal ends 68 and proximal ends mounted on a support member (not shown), as more fully shown and described in the U.S. patents referred to above. Slots 66 have open ends 70 defined by distal ends 68.

In this embodiment of the method of the invention, gun 32 is disposed with its axis parallel with the axis of the cylinder defined by blades 64 and with its dispensing end 34 facing blades 64. Wire 42 is pushed through gun 32 and out of dispensing end 34 in direction 47 by means such as rollers 38, 40 shown in FIG. 1.

In one form of this embodiment of the invention, gun 32 is simultaneously moved in Y and Z axes 50, 52 in a serpentine path as wire 42 is continuously pushed through gun 32 in direction 47. The serpentine path is symetrical about the axis of the cylinder defined by blades 64 and is formed of successive loop sections respectively lying within and outside of the cylinder joined by connecting sections in longitudinal alignment with certain slots 66. Thus, the wire is pushed through open end 70-1 of slot 66-1, forms loop section 72-1 lying outside of the circular array of blades 64, is pushed through open end 70-2 of slot 66-2 to form connecting section 74 passing through slot 66-2, and then forms loop section 72-2 lying within the circular array of blades 64. It will be seen that as the above-described movement of gun 32 continues in Y and Z axes 50, 52, a wave winding pattern is formed on blades 64. Gun 32 may also be moved in X axis 48 in overlapping relationship with blades 64 during formation of loop sections 72-1, 72-2.

It will be seen that a timed relationship must be provided between the speed of relative motion of gun 32 in all of the axes 48, 50, 52 and the rate of advance of wire 42; the rate of advance of wire 42 vis-a-vis the speed of relative motion of gun 32 determines the length of end turns 58 and prevents the application of tension to the wire.

Referring now to FIGS. 3 through 6 of the drawings in which like elements are again indicated by like reference numerals, apparatus, generally indicated at 76, is shown for forming a wave winding in stator core member 20 in the manner described above in connection with FIG. 1. Stator 20 is removably supported by nest plate 78 rotatably supported in bearing member 80 secured to top plate 82, as by threaded fasteners 84. Top plate 82 is supported by suitable frame elements 86. Index ratchet wheels 88, 90 are attached to nest plate 78 as by threaded fasteners 92. Stator core member 20 is supported on ratchet wheel 88 by spacer 94, different height spacers 94 being employed to accommodate stator cores of different stack height.

In this embodiment of the apparatus of the invention, the gun described above in connection with FIG. 1 takes the form of an elongated flexible tube 96 having wire dispensing end 98 and opposite end 100 positioned adjacent wire pushing mechanism 102 to be described hereinafter. Wire pushing mechanism 102 pushes wire 42 into end 100, through tube 96 in direction 47, and out of wire dispensing end 98, as shown at 104.

Dispensing end 98 of flexible tube 96 is mounted in block 106. Block 106 is mounted on the upper end of rod 108 which extends in parallel relationship with axis 109 of bore 30 of stator core member 20. Block 110 is mounted on rod 108 and is maintained in engagement with snap ring 112 thereon by spring 114 acting between block 110 and snap ring 116. Block 110 has transverse slot 118 formed therein which receives eccentric pin 120 on wheel 122, wheel 122, pin 120, groove 118 and block 110 thus forming a scotch yoke mechanism for oscillating rod 108, block 106 and dispensing end 98 of flexible tube 96 in X axis 48 parallel with axis 109 of stator core member 20. Dispensing end 98 of flexible tube 96 is thus oscillated in X axis 48 through bore 30 of stator core member 20 and respectively beyond opposite sides 54, 56 thereby to push wire 104 into slots 26 as above described in connection with FIG. 1.

Scotch yoke wheel 122 is mounted on and driven by shaft 124. Shaft 124 is driven from shaft 126 by chain 128 respectively engaging sprocket wheels 130, 132 on shafts 124, 126. Shaft 126 is driven by a driving motor (not shown) which drives belt 134 engaging pulley 136 on shaft 126.

Nest plate 78 and stator core member 20 are rotated in the direction shown by arrow 138 (FIG. 3), or in the opposite direction, by indexing mechanism 140 cooperating with ratchet wheel 90 or ratchet wheel 88, thereby to provide relative motion in the Y axis as above-described in connection with FIG. 1. Indexing mechanism 140, which does not form a part of the present invention, comprises a pair of lever members 142, 144, lever member 142 cooperating with ratchet wheel 90 to index nest plate 78 and stator core member 20 in the direction shown by arrow 138, and lever member 144 cooperating with ratchet wheel 88 to index in the opposite direction.

Lever members 142, 144 are selectively moved out of cooperative relationship with the respective ratchet wheel 90, 88 by wires 146, 148 respectively connected to outer ends 150, 152 of lever members 142, 144 and to the opposite ends of member 154 connected to piston rod 156 of air cylinder 158. Wires 146, 148 extend through grommet 160 in plate 162 extending between top plate 82 and bottom plate 164. Thus, retraction of piston rod 156 and member 154 to the position shown in solid lines in FIG. 3 causes wire 148 to retract lever member 144 out of cooperative relationship with ratchet wheel 88 whereas, extension of piston rod 156 and member 154 to the position shown in dashed lines at 154-1 in FIG. 3 causes wire 146 to retract lever member 142 out of cooperative relationship with ratchet wheel 90. Cylinder 158 is selectively actuated to retract or extend piston rod 156 and member 154 by control valve 159.

Lever member 142 is pivotally, eccentrically mounted by pin 166 on wheel 168, and has outer end 170 normally biased by spring 172 into engagement with eccentric pin 174 on wheel 176. Lever member 144 is similarly pivotally mounted by pin 178 on wheel 180 and has end 182 normally biased by spring 184 into engagement with eccentric pin 186 on wheel 188. It will be observed that retraction of piston 156 and member 154 thereby retracting lever member 144 moves end 182 away from pin 186 and wheel 188.

Figure 4:
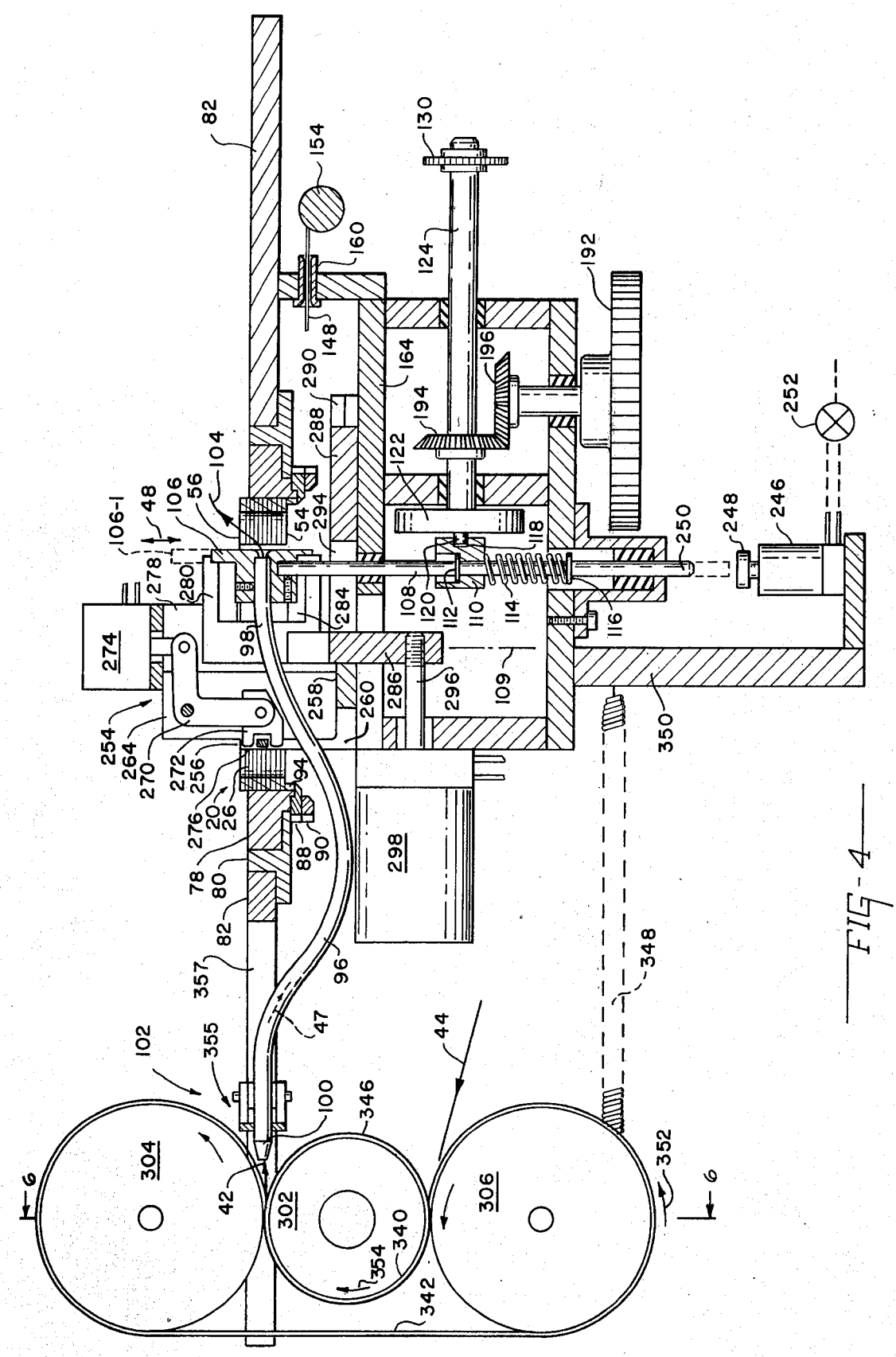
FIG. 4 is a cross-sectional view taken generally along the line 4—4 in FIG. 3.

Wheels 168, 176 are driven in the direction shown by arrows 190 by gear 192 driven from shaft 124 by bevel gears 194, 196 (FIG. 4). Gear 192 drives gear 198 on shaft 200 which drives wheel 168 in direction 190. Gear 198 drives gear 202 through idler gear 204. Gear 202 on shaft 206 drives wheel 176 in direction 190. Gear 192 drives idler gear 208 which in turn drives gears 210, 212 on shafts 214, 216 which respectively drive wheels 180, 188 in the opposite direction shown by arrows 218.

Referring now particularly to lever member 142, it will be seen that with lever member 142 being pivotally, eccentrically mounted on wheel 168 rotating in direction 190, and with end 170 being maintained by spring 172 in engagement with eccentric pin 174 on wheel 176, wheels 168, 170 rotating at the same speed and pins 166, 174 describing circles of the same diameter, end 220 of lever member 142 will tend to rotate in a circle having the same diameter. However, rotation of end 220 in a complete circle is prevented by engagement with ratchet wheel 90. In the particular embodiment shown wherein stator core member 20 has 36 slots 26 and wire is pushed into every third slot, ratchet wheels 88, 90 respectively have thirty-six teeth 222 respectively spaced at 10° intervals. Thus, starting with the position of lever member 142 shown in FIG. 3, rotation of wheels 168, 176 in direction 190 results in arcuate movement of end 220 away from tooth 222-1 and into engagement with tooth 222-2 as shown in dashed lines at 224. Upon completion of 180 degrees of rotation of wheels 168, 170 at which point end 220 of lever member 142 moves into engagement with tooth 222-2, further arcuate movement of end 220 is prevented and end 220 pushes tooth 222-2 in direction 138 by 30°, end 170 of lever 142 is thus biased away from pin 174 on wheel 176 during the final 180° of rotation of wheels 168, 176.

In the apparatus as thus far described, the gearing is selected so that rod 108 and block 106 move dispensing end 98 of tube 96 upwardly through bore 30 of stator core member 20 from a position below side 54 to a position above side 56 while pushing assembly 102 is pushing wire through tube 96, as above described, thereby pushing wire into a slot 26, while end 220 of lever member 142 is moving in path 224 between tooth 222-1 and teeth 222-2 on ratchet wheel 90. Upon block 106 and dispensing end 98 reaching its upper position, as shown in dashed lines at 106-1 in FIG. 4, end 220 of lever member 142 engages tooth 222-2 on ratchet wheel 90 and indexes that tooth, ratchet wheel 90, nest plate 78 and stator core member 20 in direction 138 by 30° to bring another slot, removed by three slots from the initial slot, into alignment with the path of movement of dispensing end 98 of tube 96, thus forming an end turn on upper side 56 of stator core member 20.

Dispensing end 98 is then moved downwardly from its upper position above side 56 to its lower position below side 54 thereby pushing the wire into the new slot, end 220 of lever member 142 again describing arcuate path 224. Upon dispensing end 98 of tube 96 reaching its lower position below side 54 of stator core member 20, lever member 142 again indexes stator core member 20 by 30° in direction 138 thereby forming another end turn on side 54 of stator core member 20. It will thus be seen that with pushing assembly 102 continually pushing wire 42 through flexible tube 96, dispensing end 98 being oscillated in X axis 48 through bore 30 of stator core member 20, and with stator core member 20 being successively indexed in direction 138, a wave winding pattern is formed in slots 26.

In the illustrated embodiment intended for forming three phase dynamoelectric machine field windings, it is necessary at the completion of the placing of one phase in slots 26 of stator core member 20, to index the core member by 10° prior to starting placement of the next phase. Such a 10° index, shown as being in the direction opposite direction 138, is provided by mechanism 226. Mechanism 226 comprises air cylinder 228 mounted on bottom plate 164 by rails 230. Slide 232 is slidably mounted on rails 230 and has lever 234 pivotally mounted thereon. End 238 of lever 234 is coupled to piston rod 240 of cylinder 228. Cylinder 228 is selectively actuated to extend or retract piston rod 240 by control valve 242. Upon extension of piston rod 240, end 244 of lever 234 is pivoted downwardly to engage a tooth 222 of ratchet wheel 88, and further extension of piston rod 244 moves slide 232 forwardly on rails 230 thereby moving end 244 of lever member 234 to the position shown in dashed lines at 244-1 thereby indexing stator core member 20 by 10°.

In the illustrated embodiment, it is also desired to move dispensing end of flexible tube 96 upwardly to its upper position at the end of placement of one phase with scotch yoke assembly 110, 118, 120, 122, at the top of its stroke thereby to permit pushing a length of wire through tube 96 to form a loop on the upper side 56 of stator core member 20; such a loop when severed provides ends for electrically connecting the winding phases. Such upper movement of dispensing end 98 of tube 96 is provided by air cylinder 246 having its piston rod 248 adapted, when extended, to engage bottom end 250 of rod 108 thereby pushing the same together with block 106 and dispensing end 98 upwardly above the upward position 106-1 to a point above the end turn. Cylinder 248 is selectively actuated to retract and extend piston rod 248 by valve 252.

In the illustrated embodiment, mechanism 254 is provided for packing wire in the slots which have been previously pushed into slots 26 as above-described and also for pushing the end turns radially outwardly thereby to permit placement of further wire in the slots. Mechanism 254 comprises a cup-shaped member 256 which extends into bore 30 of stator core member 20 and which has its bottom 258 seated on bottom plate 164. Cup-shaped member 256 has slot 260 therein for accommodating flexible tube 96 and another slot 262 for accommodating the oscillatory movement of block 106.

Members 264, 266 are mounted in cup-shaped member 256 defining slot 268 therebetween. Lever member 270 is pivotally mounted in slot 268 and actuates rear packing member 272. Lever member 270 is actuated by air cylinder 274 mounted on members 264, 266. Cylinder 264 actuates lever member 270 between a retracted position shown in solid lines in FIG. 4 in which packing member 272 is retracted into bore 30, and an extended position in which packing member 272 is extended through slots 276 in the wall of cup-shaped member 256 into slot 26 diametrically opposite block 106 and dispensing end 98 of tube 96, thereby to pack wire previously pushed into the slot toward the rear or bottom of the slot.

Members 264, 266 define a wider slot 278 facing oppositely from slot 268. A pair of end turn packing members 280, 282 are provided extending forwardly from slot 278 on upper side 56 of stator core member 20 and on opposite sides of block 106, and another pair of end turn packing members, only one of which is shown at 284, are similarly positioned on bottom side 54 of stator core member 20. Packing members 280, 282, 284 are mounted on block 286. Block 286 is secured to slide 288, slidably mounted in guides 290, 292 on bottom plate 164. Slide 288 has slot 294 therein for accommodating rod 108. Block 286 is attached to piston rod 296 of air cylinder 298. In the retracted position of cylinder 298, as shown in solid lines in FIG. 4, packing blocks 280, 282, 284 are retracted within the confines of extensions of bore 30 of stator core member 20. Extension of piston rod 296 of cylinder 298 extends packing blocks 280, 282, 284 forwardly, as indicated in dashed lines at 280-1, 282-1 in FIG. 3 thereby to pack the end turns of the winding outwardly with respect to the bore thereby moving the wire previously pushed into the respective slot 26 outwardly toward the bottom of the slot.

Figure 5:
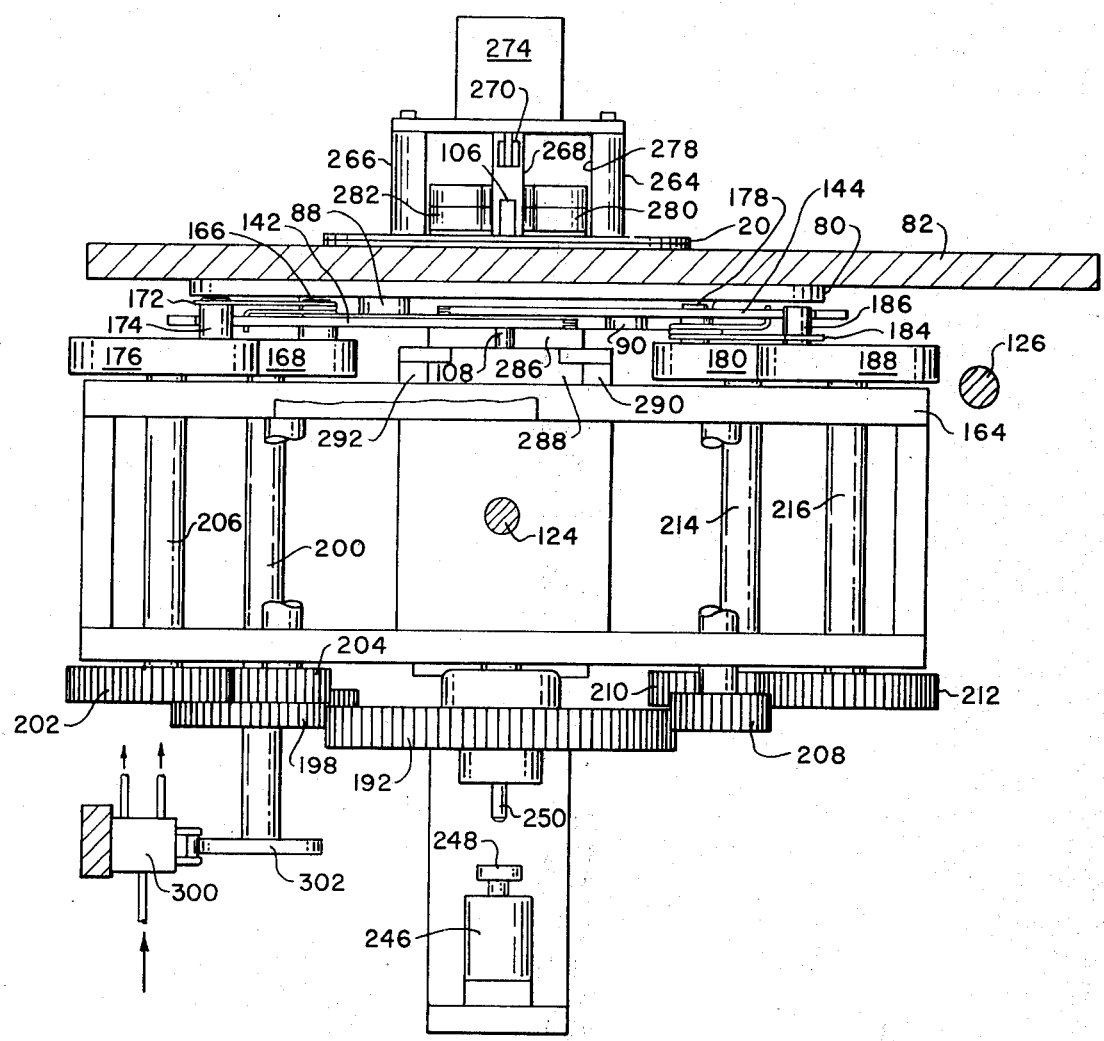
FIG. 5 is a cross-sectional view taken generally along the line 5—5 of FIG. 3.

Cylinders 274, 298 are actuated in synchronism with indexing mechanism 140, i.e., during the oscillatory up and down movement of dispensing end 98 of tube 96, by valve 300 actuated by cam 302 on shaft 200 (FIG. 5).

Figure 7:
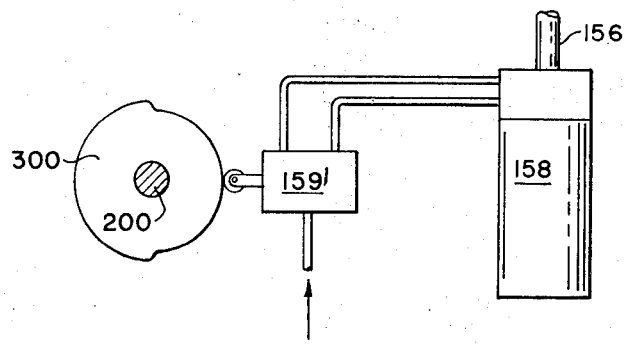
FIG. 7 is a fragmentary view showing a modification of the apparatus of FIGS. 3 through 5 for forming concentric coils.

As above-described, with valve 159 actuated in one direction or the other thereby to provide indexing by mechanism 140 in direction 138, or the opposite direction, a wave winding is provided in stator core member 20. Valve 159 could be manually actuated thereby successively to retract and extend piston rod 156 and member 154 each 180° of rotation of wheels 168, 176, 180, 188, so that stator core member 20 would be indexed at opposite directions by 30° at the end of each upward and downward stroke of dispensing end 98 of tube 96, thereby to provide a concentric coil in a respective pair of slots 26 however, such manual actuation of valve 159 is not feasible in production. Referring briefly to FIG. 7, valve 159' coupled to cylinder 158 may be actuated by cam 300 mounted for instance on shaft 200 thus automatically to retract and extend piston rod 156 and member 154 so as to actuate indexing mechanism 140 in opposite directions at the respective ends of the up and down strokes of dispensing end 98 of tube 96 thereby to form a concentric coil.

Figure 3:
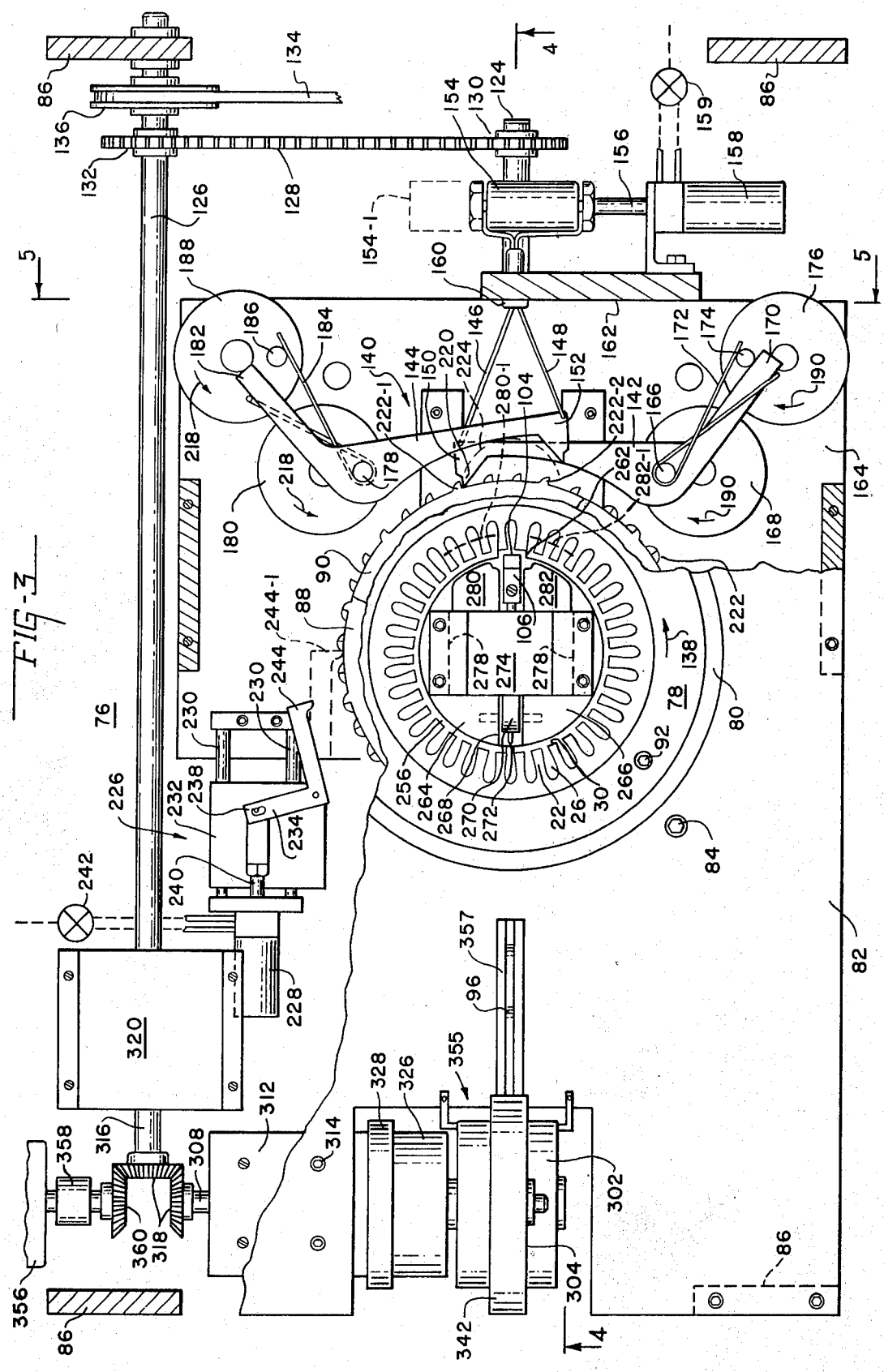
FIG. 3 is a top view, partly in section and partly broken away, showing the apparatus of the invention for placing coils in the slots of a dynamoelectric machine stator core member by pushing.
Figure 6:
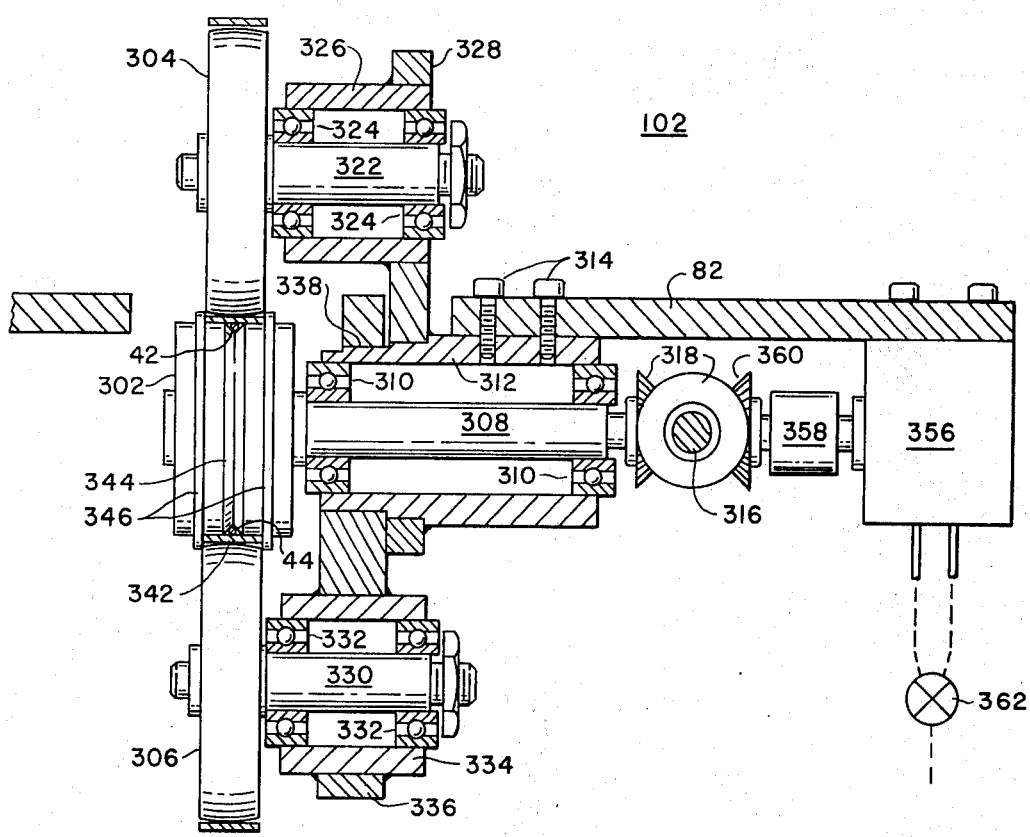
FIG. 6 is a cross-sectional view taken generally along the line 6—6 of FIG. 4.

Referring particularly to FIGS. 3, 4 and 6, pushing mechanism 102 comprises rollers 302, 304, 306. Roller 302 is mounted on shaft 308 supported by bearings 310 mounted in housing 312 secured to top plate 82, as by threaded fasteners 314. Shaft 316 drives shaft 308 through bevel gears 318. Shaft 126 drives shaft 316 through suitable speed changing gearing 320 which provides a selectively adjustable timed relationship between the speed of oscillating motion of dispensing end 89 of tube 96 and the rate of indexing stator core 20 on the one hand, and the rate of advancing wire 42 by pushing mechanism 102 on the other. Roller 304 is mounted on shaft 322 supported by bearings 324 mounted in housing 326, housing 326 being mounted on housing 312 by plate 328. Roller 306 is mounted on shaft 330 supported on bearings 332 mounted in housing 334. Housing 334 is mounted on plate 336 pivotally mounted on bearing portion 338 of housing member 312.

End 44 of wire 42 extending from a reel or other source of magnet wire is trained around peripheral portion 340 of roller 302 and extends therefrom to and into end 100 of flexible tube 96 (FIG. 4). Bracket assembly 355 supports end 100 of flexible tube 96 in slot 357 in top plate 82. Endless belt 342 is trained around rollers 304, 306 and around peripheral portion 340 of roller 302, over and engaging wire 42. Roller 302 may have wire-receiving groove 344 formed therein and flanges 346 which guide and locate belt 342. Spring 348 (FIG. 4) extends between pivoted plate 336 (FIG. 6) and frame element 350 thereby biasing roller 306 in the direction shown by arrow 352 to apply tension on belt 342 so that it tightly engages wire 42 and forces it into driving engagement with groove 344 in roller 302. It will thus be seen that driving roller 302 in the direction shown by arrow 354 results in withdrawing wire 42 from the source (not shown) and pushing it through flexible tube 96 as shown by arrow 47, out of dispensing end 98, and into slots 26, as above-described.

In order to push out a length of wire upon completion of a winding phase, as above-described, a reversible drive motor 356, shown here as being pneumatically operated, is coupled by slip clutch 358 and bevel gear 360 to bevel gears 318. Thus, upon completion of the winding of a phase and with dispensing end 98 of tube 96 pushed upwardly by cylinder 246, as above-described, drive motor 356 is actuated by valve 362 to drive roller 302 thereby to push a length of wire through tube 96 and dispensing end 98 to form the desired loop.

Figure 10:
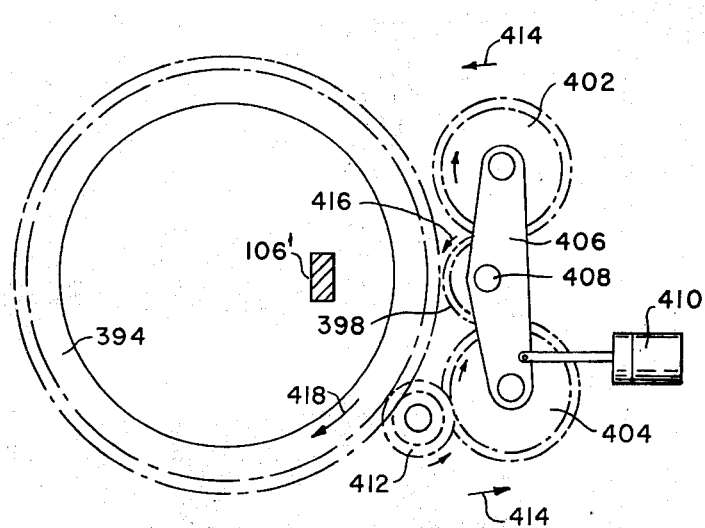
FIG. 10 is a cross-sectional view taken generally along the line 10—10 of FIG. 8.
Figure 8:
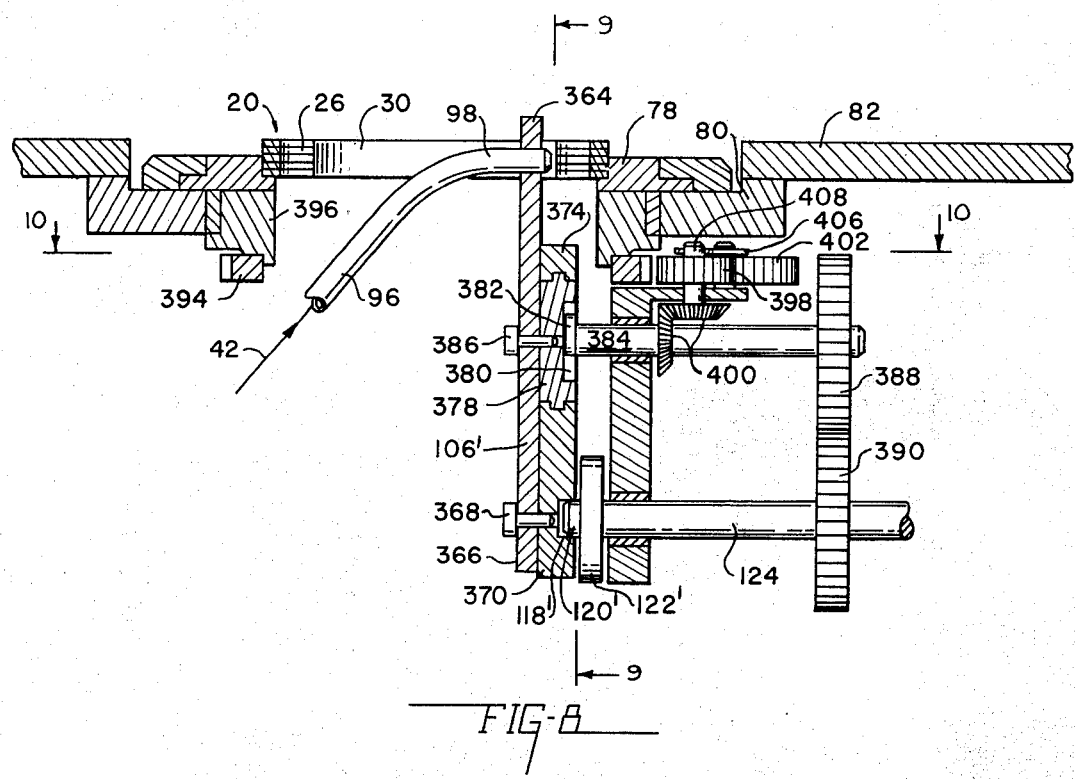
FIG. 8 is a fragmentary cross-sectional view showing another embodiment of the apparatus of the invention for placing dynamoelectric machine coils in the slots of a stator core member by pushing.
Figure 9:
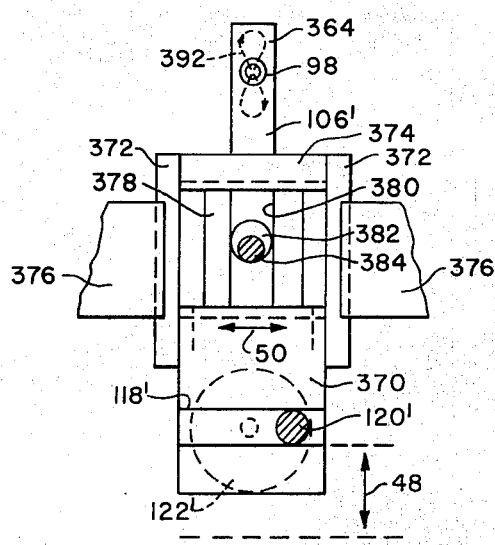
FIG. 9 is a cross-sectional view taken generally along the line 9—9 of FIG. 8.

Referring now to FIG. 8, 9 and 10 in which like elements are indicated by like reference numerals and similar elements by primed referenced numerals, an embodiment is shown wherein a figure eight motion is imparted to dispensing end 98 of flexible tube 96 accompanied by continuous rotation of stator core member 20 thereby to provide a wave winding pattern. Here, dispensing end 98 is mounted in upper end 364 of actuating bar 106'. Lower end 366 of bar 106' is pivotally connected by pivot pin 368 to scotch yoke block 370 having transverse slot 118' therein. Eccentric pin 120' on wheel 122' is received in slot 118', wheel 122' being driven by shaft 124. It will thus be seen that rotation of shaft 124 and wheel 122' results in oscillatory motion of scotch yoke block 370, bar 106' and dispensing end 98 of tube 96 in X axis 48, as shown.

Scotch yoke block 370 is connected by side guide bars 372 to upper guide bar 374. Side guide bars 372 are received in and guided by guides 376 which thus guide scotch yoke block 370 for movement in the X axis 48. Guides 376 are mounted on the frame of the apparatus.

Another scotch yoke block 378 is mounted for sliding movement in Y axis 50 between guide 374 and scotch yoke block 370. Scotch yoke block 378 has a vertically extending slot 380 therein. Cam 382 on shaft 384 is received in slot 380, slot 380 accommodating the vertical movement of scotch yoke block 370 in X axis 48 and also imparting transverse movement in Y axis 50 to scotch yoke block 378. Bar 106' is pivotally connected to scotch yoke block 378 by pivot pin 386. Shaft 384 is driven by drive shaft 124 through gears 388, 390. It will now be seen that rotation of drive shaft 124 results in scotch yoke block 370, 378 imparting a figure eight motion to dispensing end 98 of flexible tube 96, as indicated in dashed lines at 392.

Drive gear 394 is mounted on nest plate 78 by ring 396. Drive shaft 384 drives idler gear 398 through bevel gears 400. Idler gear 398 drives gears 402, 404 mounted on bracket 406 pivotally mounted on shaft 408 of gear 398. Bracket 406 is pivotally moved by cylinder 410 from the position shown in FIG. 10 in which gear 404 drives index gear 394 through idler gear 412 to a position in which gear 402 drives index gear 394, as shown by arrow 414. Thus, with cylinder 410 extended, as shown in FIG. 10, and with gear 398 being driven in the direction shown by arrow 416, index gear 398 is continuously driven in the direction shown by arrow 418 by gears 398, 404 and 412. With cylinder 410 retracted so as to move gear 404 out of mesh with gear 412 and gear 402 into mesh with index gears 394, index gear 394 is driven in the opposite direction.

It will now be seen that the combination of the oscillatory motion in both X axis 48 and Y axis 50 imparted to dispensing end 98 of tube 96 resulting in figure eight pattern 392, and continuous rotation of indexing gear 394 and stator core member 20 will result in formation of a wave winding pattern in slots 26.

Figure 11:
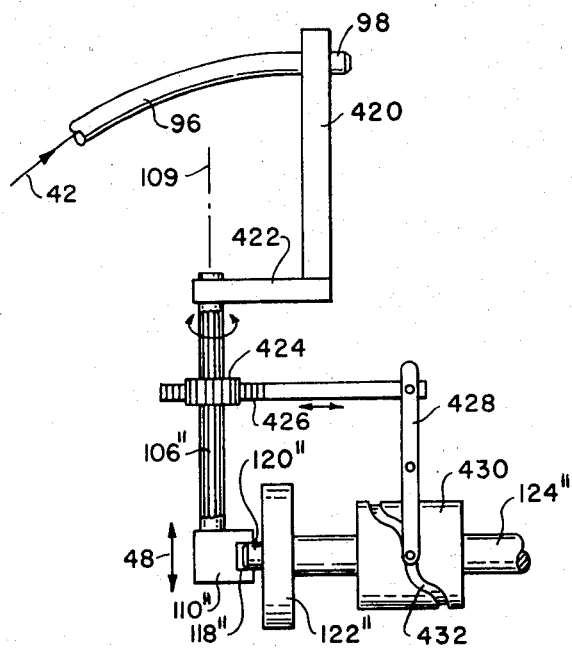
FIG. 11 is a fragmentary side view showing another embodiment of the apparatus of the invention for placing dynamoelectric machine field coils in the slots of a dynamoelectric machine stator core member by pushing.

Referring now to FIG. 11 in which like elements are again indicated by like reference numerals and similar elements by double primed reference numerals, an embodiment is shown wherein dispening end 98 of flexible tube 96 is oscillated in X axis 48 and, at the end of each extremity of the X axis oscillation, rotated in the Y axis 50 thereby to form concentric coils, stator core member 20 (not shown in FIG. 11) indexing only upon completion of one concentric coil to the proper position for formation of the next concentric coil.

Here, rod 106'' is preferably disposed on axis 109 of bore 30 of stator core member 20. Dispensing end 98 is mounted in bar 420 connected to rod 106'' by lever 422. Thus, rotation of drive shaft 124'' will cause yoke assembly 110'', 118'', 120'' and 122'' to oscillate rod 106'', bar 420 and dispensing end 98 in X axis 48. Rod 106'' is rotatably mounted in scotch yoke block 110'' and is rotated about axis 109 by pinion 424 driven by rack 426. Rack 426 is oscillated by pivoted lever 428, actuated by barrel cam 430 on shaft 124''. Cam track 432 is portioned and arranged to rotate rod 106'', lever 422, bar 420 and dispensing end 98 in one direction at one extremity of the oscillatory motion of dispensing end 98 in X axis 48, and in the other direction at the other extremity.

The barrel cam, rack and pinion mechanism for imparting rotary motion at the ends of an oscillatory stroke in a gun winder is shown in the aforesaid U.S. Pat. No. 3,025,008.

Figure 12:
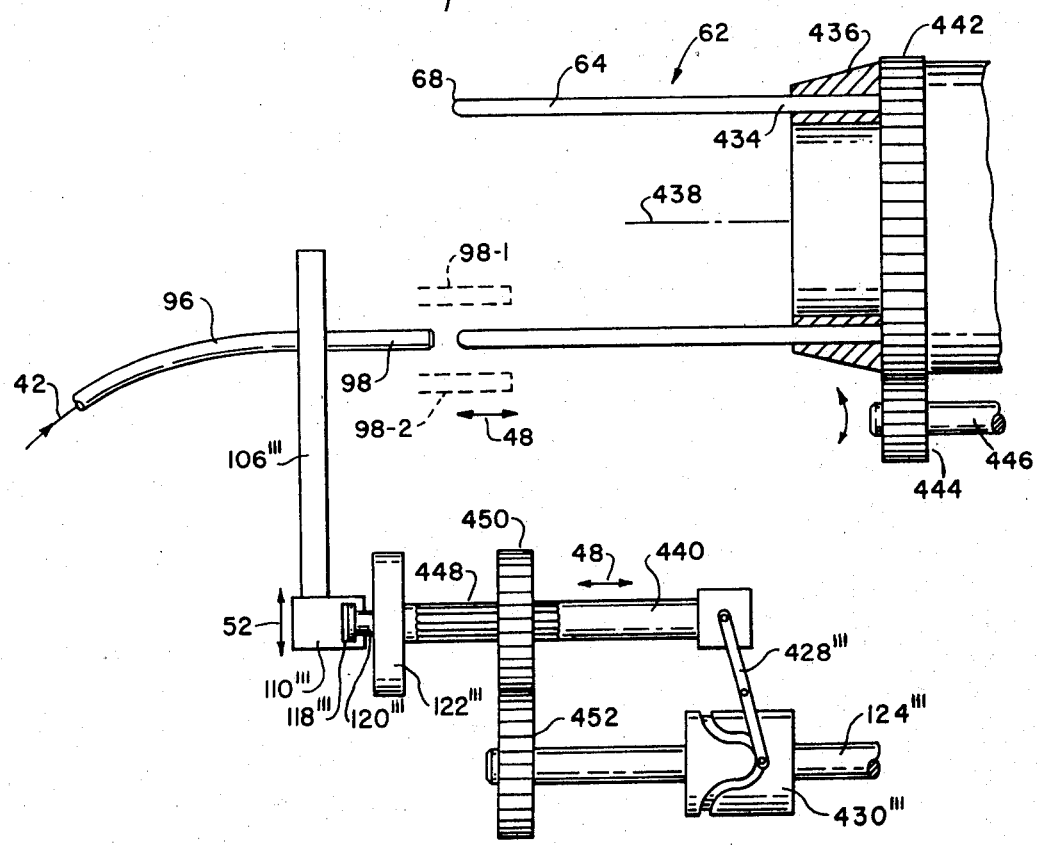
FIG. 12 is a fragmentary side view, partly in cross section, illustrating another embodiment of the apparatus of the invention for placing dynamoelectric machine coils on the blades of coil insertion apparatus by pushing.

Referring now to FIG. 12 in which like elements are again indicated by like reference numerals and similar elements by triple primed reference numerals, there is shown an embodiment of the apparatus of the invention for placing magnet wire on the blades of coil insertion apparatus to form a dynamoelectric machine field winding. Here, blades 64 of the circular array of blades 62 have their proximal ends 434 mounted on support member 436, as more fully illustrated and described in the aforesaid U.S. Pat. No. 3,324,536. Here, dispensing end 98 of flexible tube 96 is mounted on bar 106''', the axis of dispensing end 98 being parallel with axis 438 of the circular array of blades 62. Bar 106''' and dispensing end 98 are oscillated in Z axis 52 (FIG. 2) radially with respect to axis 438 by scotch yoke assembly 110''', 118''', 120''' and 122''' driven by shaft 440.

Blade assembly 62 is rotated about axis 438 thereby to provide relative motion in Y axis 50 by index gear 442 on support member 436 driven by pinion 444 on shaft 446.

It will now be seen that simultaneous rotation of blade assembly 62 about axis 438 and oscillation of dispensing end 98 in Z axis 52 will provide the serpentine path of movement described above in connection with FIG. 2.

In order to move dispensing end 98 in X axis 48 parallel with axis 438 of blade assembly 62 into overlapping relationship with distal ends 68 during formation of loop portions 72-1, 72-2, as shown by dashed lines 98-1, 98-2, shaft 440 has a splined connection, as at 448, with gear 450 driven by gear 452 on drive shaft 124''', splined connection 448 accommodating movement of shaft 440 in X axis 48. Movement of shaft 440 along with the scotch yoke assembly, rod 106''' and dispensing end 98 in X axis 48 is imparted by pivoted lever 428''' actuated by barrel cam 430''' on shaft 124'''.

Figure 13:
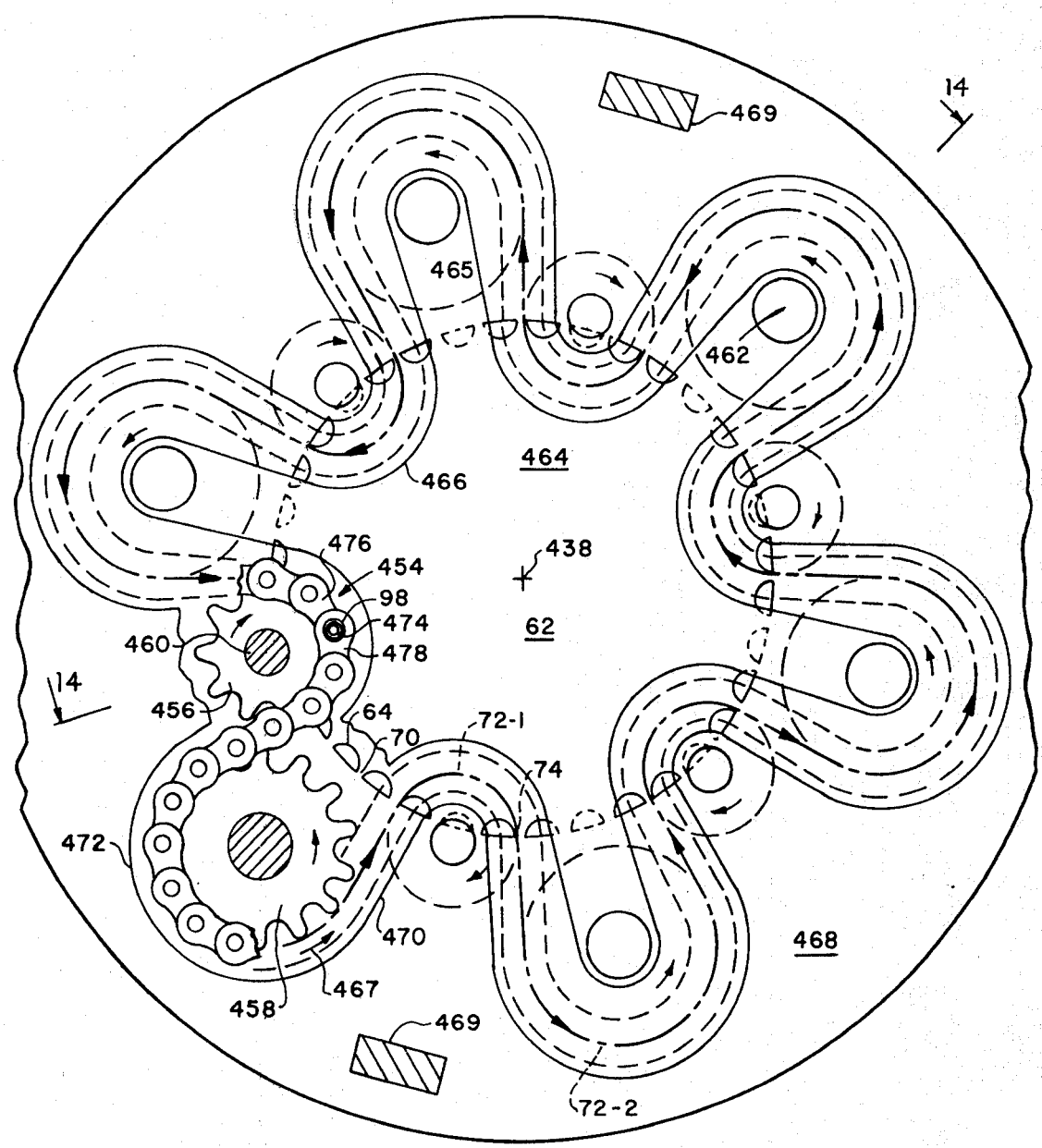
FIG. 13 is a fragmentary top view showing yet another embodiment of the apparatus of the invention for placing dynamoelectric machine field coils on the blades of coil insertion apparatus by pushing.
Figure 14:
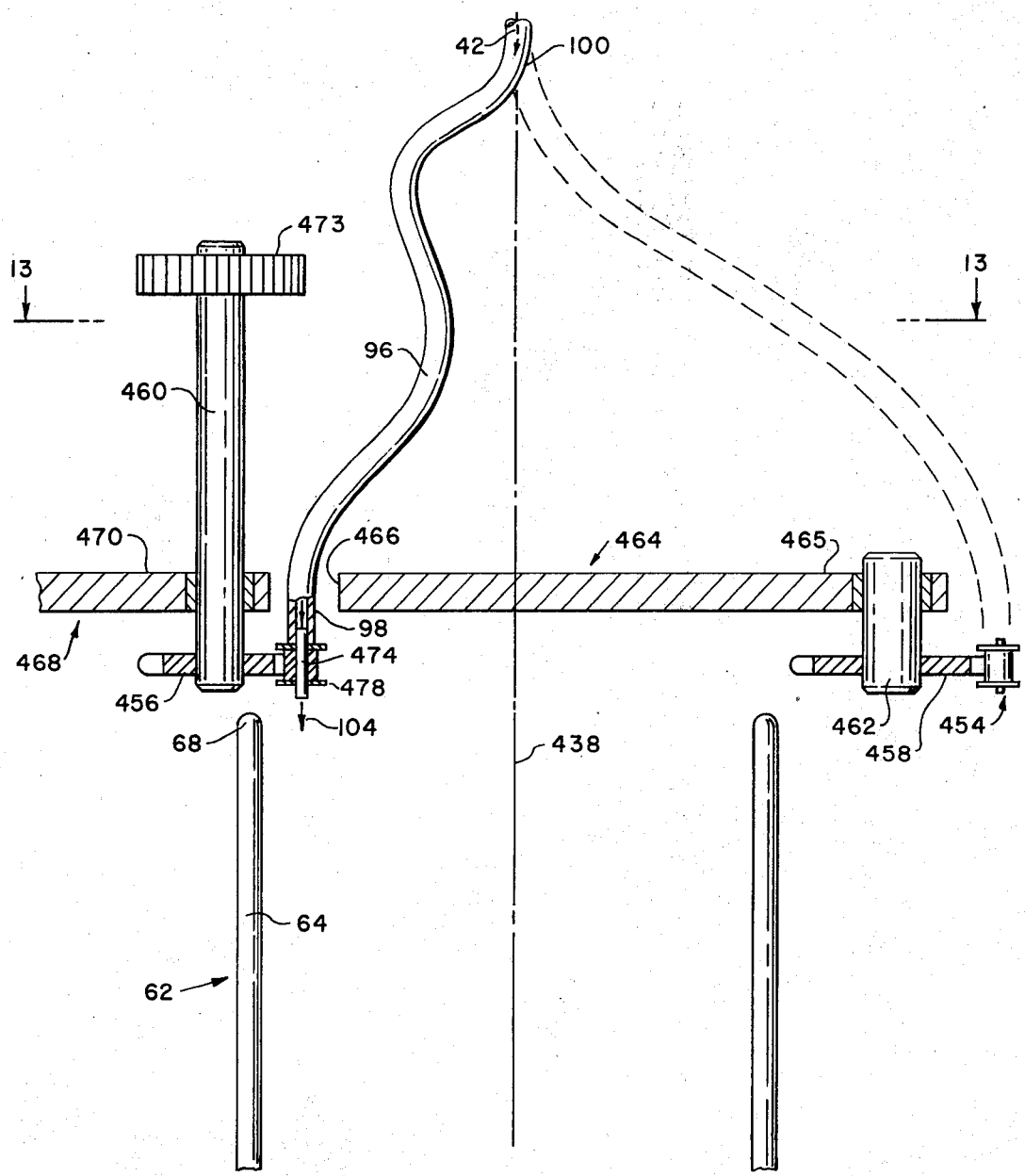
FIG. 14 is a cross-sectional view taken generally along the line 14—14 of FIG. 13.

Referring now to FIGS. 13 and 14, there is shown a preferred embodiment of the apparatus of the invention for placing magnet wire on the blades of coil insertion apparatus by pushing to form wave wound dynamoelectric machine field windings. Here, in which like elements are again indicated by like reference numerals, an endless flexible element, shown as being a chain 454, is formed in the serpentine path described above in connection with FIG. 2 by sprockets 456, 458. Chain 454 is disposed in a plane normal to axis 438 of the circular array of blades 62 and closely spaced from distal ends 68 of blades 64.

Top plate 468 is supported by frame members 469 and has a central opening therein coaxial with axis 438 of the array of plate 62, projections 470 extending into the central opening and defining recesses 472 therebetween. Sprockets 456 are mounted on shafts 460 journaled in bearings seated in projections 470 of top plate 468. Sprockets 458 are mounted on shafts 462 journaled in bearings seated in projections 465 on spider member 464, projections 465 defining recesses 466 therebetween. It will be seen that sprockets 456 and the length of chain 454 respectively trained therearound are respectively accommodated in recesses 466 in spider member 464 while sprockets 458 and the lengths of chain 454 respectively trained therearound are respectively accommodated in recesses 472 in top plate member 468. Sprockets 458 are captured by chain 454 and thus spider member 464 requires no independent support. One or more sprockets 456 is driven by drive gear 473 thereby advancing drive chain 454, for example in the direction shown by arrow 467.

Dispensing end 98 of flexible tube 96 is rotatably mounted on eyelet 474 which forms the pivotal connection between an adjacent pair of chain links 476, 478. The axis of dispensing end 98 and eyelet 474 is again parallel with axis 438 of blade assembly 62 and, in this embodiment, opposite end 100 of tube 96 which is disposed on axis 438.

It will now be seen that chain 454, guided in a serpentine path symmetrical about axis 438 by sprockets 456, 458, guides dispensing end 98 of flexible tube 96 in a corresponding serpentine path with loop section 72-1 within the immaginary cylinder defined by the circular array of blades 62, loop sections 72-2 outside of the cylinder, and connecting sections 74 respectively aligned with open ends 70 of slots 66 defined by blades 64. Thus, upon advancing chain 454 in direction 467 while pushing wire 42 through flexible tube 96, dispensing end 98 and eyelet 474, wire 104 pushed from eyelet 474 follows the corresponding serpentine path and enters upon end 70 of slot 66 thereby to form a wave winding pattern, as described above in connection with FIG. 2. It will be seen that the rotatable connection between dispensing end 98 of tube 96 and eyelet 474 permits dispensing end 98 to be rotated about axis 438 without twisting tube 96. It will further be seen that in this embodiment, only one twist is imparted to magnet wire 42 during one complete passage of dispensing end 98 and eyelet 474 about the serpentine path formed by chain 454.

It will be understood that wire pushing mechanism, such as mechanism 102 of FIGS. 3, 4 and 6 will be employed with the apparatus of FIGS. 13, 14 and that such mechanism will be driven by a variable speed drive, such as gearing 320, thereby to provide a selectively adjustable timed relationship between the rate of advancing wire 42 and the speed of chain 454.

Referring now to FIGS. 15, 16, and 17, there is shown another embodiment of the apparatus of the invention for placing magnet wire on the blades of coil insertion apparatus by pushing to form concentric wound dynamoelectric machine field windings. Here, in which like elements are again indicated by like reference numerals, circular plate member 480 is secured to shaft 482 having its axis 483 in spaced, parallel relationship with axis 438 of the circular array of blades 62. Shaft 482 is rotatably journaled in slide 484. Plate 480 is closely spaced from distal ends 68 of blades 64.

Plate 480 has radial slot 486 formed therein. Block 488 is slidably mounted in slot 486 and has dispensing end 98 of flexible tube 96 mounted therein. Tube 96 extends into an opening in the side of shaft 482 and end 100 is disposed on axis 483. Pushing mechanism, such as mechanism 102 of FIGS. 3, 4 and 6, pushes wire 42 through flexible tube 96. Bracket 490 on block 488 supports cam roller 492. Cam roller 492 is received in elliptical cam track 494 formed in member 500 which surrounds shaft 482. Member 500 is supported from slide 484 by brackets 502. Shaft 482, plate 480 and flexible tube 96 are rotated by drive motor 504 supported on slide 484 which drives pinion 506 engaging gear 508 on shaft 482. Slide 484 is slidably mounted in ways 510. The entire assembly comprising slide 484, shaft 482, plate 480 and member 500 may thus be moved in the direction shown by arrow 511 by cylinder 512 from the position shown in solid lines in FIG. 15 to the position shown in dashed lines at 502a.

It will now be seen that rotation of shaft 482 and plate 480 in the direction shown by arrow 514 (FIG. 17) will cause cam 492 to follow elliptical cam track 494 thus moving block 484 radially inwardly and outwardly in slot 486 in plate 480 so that dispensing end 98 of flexible tube 96 is caused to follow an elliptical path as shown in dashed lines at 516 in FIG. 16. Thus, upon rotating shaft 482 and plate 480 while pushing wire 42 through flexible tube 96, wire 104 pushed from dispensing end 98 follows elliptical path 116 and enters two slots 66-1 thereby to form a first concentric coil 518 having end turn sections 519, 521 respectively within and without the circular array 62 of blades 64 and joined by connecting sections 523 which are respectively pushed into slots 66-1, 66-2. Upon lateral movement of the assembly to the position shown in dashed lines at 502a in FIG. 15, and continuing to rotate shaft 482 and plate 480 while pushing wire 42 through flexible tube 96, wire 104 is pushed into a second pair of slots 66-2 angularly spaced from slot 66-1 thereby to form a second concentric coil 520.

Shaft 482 and plate 480 are driven by motor 504 in selectively adjustable timed relationship with the rate of advance of wire 42 by the pushing mechanism thereby to control the size of coils 518, 520.

It will be readily understood that the apparatus of FIGS. 12–17 may be employed for placing dynamoelectric machine field coils on the blade or finger elements of intermediate coil transfer apparatus, such as that shown in U.S. Pat. No. 3,686,735.

It will readily be seen that cam track 494 need not be elliptical and may have any desired configuration so as to form coils 518, 520 in the desired shape.

The apparatus of the invention employs a gentle pushing process of placing magnet wire into stator core slots or onto the blades of coil insertion apparatus which subjects the wire to far less abuse than prior apparatuses which wound wire under tension. Thus, it is possible to use magnet wire having enamel films with good electrical characteristics but lesser mechanical properties than previously required, and thicker enamel builds and/or new films are also rendered practical.

While there have been described above the principles of this invention in connection with specific apparatus, it is to be clearly understood that this description is made only by way of example and not as a limitation to the scope of the invention.

What is claimed is:

1. Apparatus for placing magnet wire in slots respectively defined by spaced elements extending from a support member thereby to form a dynamoelectric machine field winding, said elements having distal ends, said apparatus comprising means spaced from said distal ends on the side thereof remote from said support member for guiding said wire toward said elements, means for continuously pushing wire through said guide means, and means for moving said guide means, as said wire is being continuously pushed therethrough, relative to said elements in a path aligned with at least two of said slots and with a motion having components in at least two mutually perpendicular axes thereby continuously to push said wire into said slots without applying tension thereon and to guide the wire as it is being continuously pushed between said slots to form end turns.

2. The apparatus of claim 1 further comprising means for providing a timed relationship between the speed of said pushing means and the speed of said moving means.

3. The apparatus of claim 1 wherein said guide means comprises a gun member having a wire dispensing end extending toward said elements and having an opposite end, said dispensing end being spaced from said distal ends on the side thereof remote from said support member, said pushing means acting on said wire at a location on the side of said opposite end remote from said dispensing end.

4. The apparatus of claim 3 wherein said gun member comprises an elongated tube with said dispensing end adjacent said elements and said opposite end adjacent said pushing means, said moving means including means acting on said tube for moving the same in at least one of said axes of relative motion.

5. The apparatus of claim 3 wherein said elements define an imaginary cylinder having an axis, said moving means including first means for moving said dispensing end in at least one of said axes of relative movement thereby to push said wire into said slots, and second means for rotating said elements about said cylinder axis thereby to provide said relative movement in a second of said axes of relative movement.

6. The apparatus of claim 5 wherein said one axis of relative movement is parallel with said cylinder axis.

7. The apparatus of claim 5 wherein said first means imparts a figure eight motion to said dispensing end.

8. The apparatus of claim 3 wherein said elements are the teeth and said support member is the yoke of a dynamoelectric machine stator core member, said core member having opposite sides and said teeth having inner ends defining a bore, said moving means moving said dispensing end relative to said core through said bore in at least one of said axes of movement thereby to push said wire into said slots, said moving means moving said dispensing end relative to said core in at least a second of said axes of movement in paths respectively spaced from said opposite sides of said core thereby to form said end turns.

9. The apparatus of claim 8 wherein said bore has an axis, said dispensing end having an axis which extends radially with respect to said bore axis.

10. The apparatus of claim 9 wherein said moving means includes means for oscillating said dispensing end in said one axis with said core member being fixed with respect to said one axis of movement, and means for rotating said core member about the axis of said bore thereby to provide said relative movement in said second axis.

11. The apparatus of claim 10 wherein said rotating means rotates said core member in one direction thereby to form a wave winding.

12. The apparatus of claim 9 wherein said moving means includes first means for oscillating said dispensing end in said one axis, and second means for oscillating said dispensing end in said second axis.

13. The apparatus of claim 1 wherein said elements are the teeth and said member is the yoke of a dynamoelectric machine stator core member, said core member having opposite sides and said teeth having inner ends defining a bore having an axis, and further comprising means for supporting said core for rotation about said bore axis, said guide means comprising an elongated flexible tube having a wire dispensing end extending toward and adjacent said teeth and having an opposite end adjacent said pushing means, said dispensing end having an axis which extends radially with respect to said bore axis, said moving means comprising means for oscillating said dispensing end through said bore and respectively beyond said opposite sides of said core in one of said axes of movement thereby to guide said wire into said slots, and means for indexing said dispensing end relative to said core member in a second of said axes of movement in paths respectively spaced from said opposite sides of said core thereby to form said end turns, and means for selectively adjusting the relationship between the speed of said pushing means and the speed of said moving means thereby to control the size of said end turns.

14. The apparatus of claim 13 wherein said indexing means comprises means for rotating said core member.

15. The apparatus of claim 14 wherein said oscillating means moves said dispensing end in a straight-line path parallel with said bore axis.

16. The apparatus of claim 14 wherein said rotating means rotates said core member a predetermined incremental amount in the same direction when said dispensing end is adjacent the extremities of its oscillation thereby to form a wave winding.

17. The apparatus of claim 14 wherein said oscillating means includes means for moving said dispensing end in a figure eight path, said rotating means continuously rotating said core member in synchronism with said oscillating means thereby to form a wave winding.

18. The apparatus of claim 13 wherein said oscillating means moves said dispensing end in a straight-line path parallel with said bore axis, said indexing means comprising second means for oscillating said dispensing end about said bore axis.

19. The apparatus of claim 18 wherein said second oscillating means respectively moves said dispensing end in opposite directions when said dispensing means is at the opposite ends of its oscillation in said one axis thereby to form a concentric winding.

20. The apparatus of claim 13 further comprising means for packing said wire in said slots.

21. The apparatus of claim 20 wherein said packing means comprises a first member diametrically opposite said dispensing end of said tube, means for moving said member between a retracted position in said bore and a position extending into a said slot thereby to pack the wire therein, second and third members on one side of said core and spaced apart to accommodate the oscillation of said dispensing end, fourth and fifth members on the other side of said core and spaced apart to accommodate the oscillation of said dispensing end, and means for moving said second through fifth members between a retracted position within the confines of an imaginary cylindrical extension of said bore and extended positions engaging said end turns.

22. Apparatus for placing magnet wire in slots respectively defined by spaced elements extending from a support member thereby to form a dynamoelectric machine field winding, said elements having distal ends, said apparatus comprising means spaced from said distal ends on the side thereof remote from said support member for guiding said wire toward said elements, means for pushing wire through said guide means, and means for moving said guide means relative to said elements in a path aligned with at least two of said slots and with a motion having components in at least two mutually perpendicular axes thereby to push said wire into said slots and to guide the wire as it is being pushed between said slots to form end turns, said pushing means comprising a first roller having a peripheral surface, said wire extending from a source, being trained around a part of said surface, and extending therefrom to said guide means, second and third rollers respectively on opposite sides of said first roller, an endless belt trained around said second and third rollers and around said surface part of said first roller over and in engagement with said wire thereon, and means for driving said rollers in a direction to withdraw said wire from said source and to push the same to and through said guide means.

23. The apparatus of claim 22 wherein said guide means comprises an elongated tube having a wire dispensing end extending toward said elements, said tube having an opposite end adjacent said first roller for receiving the wire pushed therefrom.

24. The method of placing magnet wire in slots respectively defined by spaced elements extending from a support member to form a dynamoelectric machine field winding, said method comprising continuously advancing said wire by pushing the same on its axis, and guiding said wire as it is being continuously pushed without applying tension thereon in a path aligned with at least two of said slots and with a motion having components in at least two mutually perpendicular directions which are normal to said wire axis thereby to push said wire into said slots and to form end turns therebetween.

25. The method of claim 24 comprising the further step of controlling the relationship of the rate of said pushing with the speed of said motions.

* * * * *